US011525681B2

(12) United States Patent
Vaganay (10) Patent No.: US 11,525,681 B2
(45) Date of Patent: Dec. 13, 2022

(54) METHOD AND APPARATUS FOR SELF-CONTAINED POSITIONING OF A MOBILE ROBOT INSIDE A TANK (71) Applicant: Square Robot, Inc., Boston, MA (US)

(72) Inventor: Jerome Vaganay, Norwell, MA (US)

(73) Assignee: Square Robot, Inc, Boston, MA (US)

( * ) Notice: Subject to any disclaimer, the term of this patent is extended or adjusted under 35 U.S.C. 154(b) by 0 days.

(21) Appl. No.: 17/575,392

(22) Filed: Jan. 13, 2022

(65) Prior Publication Data
US 2022/0136835 A1 May 5, 2022

Related U.S. Application Data (63) Continuation of application No. 16/609,708, filed as application No. PCT/US2018/039719 on Jun. 27, 2018, now abandoned.

(60) Provisional application No. 62/527,128, filed on Jun. 30, 2017.

(51) Int. Cl.
*G01C 21/16* (2006.01)
*G01C 21/20* (2006.01)
*G05D 1/00* (2006.01)
*G05D 1/02* (2020.01)
*G05D 1/06* (2006.01)
*G05D 1/10* (2006.01)

(52) U.S. Cl.
CPC ........... *G01C 21/165* (2013.01); *G01C 21/20* (2013.01); *G05D 1/0088* (2013.01); *G05D 1/027* (2013.01); *G05D 1/0255* (2013.01); *G05D 1/0272* (2013.01); *G05D 1/0692* (2013.01); *G05D 1/10* (2013.01); *G05D 2201/0207* (2013.01)

(58) Field of Classification Search
CPC ........ G01C 21/165; G01C 21/20; G05D 1/10; G05D 1/0088; G05D 1/0255; G05D 1/027; G05D 1/0692; G05D 2201/0207
See application file for complete search history.

(56) References Cited

U.S. PATENT DOCUMENTS

| | | | |
|---|---|---|---|
| 6,317,387 B1 | 11/2001 | D'Amaddio et al. | |
| 7,467,560 B2 * | 12/2008 | Silverman | G01N 29/225 73/623 |
| 2003/0187560 A1 | 10/2003 | Keller et al. | |

(Continued)

OTHER PUBLICATIONS

Allotta et al.; Localization Algorithm for a fleet of three AUVs by INS, DVL and Range measurements; 15th Intl. Conf. on Advanced Robotics; Tallin Univ. of Tech.; Tallin, Estonia; Jun. 20-23, 2011 (Year: 2011).*

(Continued)

*Primary Examiner* — Michael J Zanelli
(74) *Attorney, Agent, or Firm* — Foley & Lardner LLP (57) ABSTRACT A method and apparatus for positioning a mobile robot inside a vertical cylindrical Aboveground Storage Tank filled with a liquid is described. No additional hardware is needed other than the robot itself. The only piece of information needed is the tank's diameter which is known by construction. The robot carries proprioceptive sensors needed to propagate its position estimate as well as exteroceptive sensors needed to control the dead reckoning positional drift. Proprioceptive and exteroceptive data are merged using data fusion algorithms adapted to the sensor suite integrated in the vehicle, which can take different forms.

26 Claims, 9 Drawing Sheets (56) References Cited

U.S. PATENT DOCUMENTS

| | | | |
|---|---|---|---|
| 2009/0031940 A1 | 2/2009 | Stone et al. | |
| 2011/0266086 A1 | 11/2011 | Welker et al. | |
| 2015/0158174 A1 | 6/2015 | Romanov et al. | |
| 2017/0010146 A1 | 1/2017 | Kassubek et al. | |
| 2017/0248554 A1* | 8/2017 | Fedosovsky | G01N 33/20 |

OTHER PUBLICATIONS

Schempf et al.; Neptune: Above-Ground Storage Tank Robot Inspection; IEEE Robotics & Automation Magazine; vol. 2, No. 2; pp. 9-15; Jun. 1995 (Year: 1995).*

Galceran, Enric et al, "Profile Following for Inspection of Underwater Structures." PALADYN Journal of Behavioral Robotics, 2013, pp. 1-4 [online][retrieved on Oct. 3, 2018) <URL: https://www.degruyter.com/downloadpdf/j/pjbr.2013.4. issue-4/pjbr-2013-0019/pjbr-2013-0019.pdf>.

Giordano, Francesco et al., "Integrating Sensors into a Marine Drone for Bathymetric 30 Surveys in Shallow Waters."Sensors, 2016, pp. 1 [online ][retrieved on Oct. 3, 2018)<URL:https:l/www.nebi .nlm .nih.gov/pmc/articles/PMC4 73207 4/ pdf/sensors-16-00041 .pdf>.

International Search Report and Written Opinion of the International Searching Authority for application PCT/US18/39719 dated Oct. 26, 2018.

Teledyne, "High resolution structural inspection of flooded tunnel using BlueView T2250 360 Multibeam Profiling Sonar and Teledyne PDS." Datasheet Teledyne BlueView Teledyne PDS, 2016 [online][retrieved on Oct. 3, 2018) <URL: http:l/www.teledynemarine.com/news/High-resolution?structural-inspection-of-flooded-tunnel>.

\* cited by examiner

METHOD AND APPARATUS FOR SELF-CONTAINED POSITIONING OF A MOBILE ROBOT INSIDE A TANK

CROSS-REFERENCE TO RELATED APPLICATIONS

The present application claims the benefit of priority under 35 U.S.C. § 120 as a continuation of U.S. Non-Provisional application Ser. No. 16/609,708, filed on Oct. 30, 2019, which is a U.S. National Phase Application under 35 U.S.C. § 371 of International Application No. PCT/US2018/039719, filed on Jun. 27, 2018, which claims the benefit of and priority to U.S. Provisional Application No. 62/527,128, filed on Jun. 30, 2017, the entire disclosure of each of which is incorporated by reference herein for any and all purposes.

BACKGROUND OF THE INVENTION

1. Field of the Invention

The subject invention relates to a method and an apparatus for positioning a mobile robot vehicle in a liquid-filled vertical cylindrical tank that does not rely on any additional equipment other than the robot itself. The invention can position the robot vehicle within the tank whether it operates in contact with the floor, swims at any altitude above the tank's floor, or switches between swimming and rolling on the floor. The invention applies to aboveground storage tanks containing water or petroleum/chemical products, for example.

2. Description of the Related Art

Determination of the position and heading of a robotic crawler on the floor of a cylindrical vertical Aboveground Storage Tank (AST) filled with petroleum product is typically done using at least two acoustic transceivers on the robot and several acoustic transponders mounted on the outside of the tank's shell, just above the tank's floor level (see U.S. Pat. No. 5,627,800 for a description of this positioning method and U.S. Pat. Nos. 5,205,174, and 5,435,405, and published US patent application 20160299031 for examples of use of this transponder-based positioning approach in a tank robot system). The acoustic travel times between the vehicle's transceivers and transponders are used to compute the position of the two vehicle transceivers, which provides the vehicle's position. Given the known distance between the two vehicle-mounted transceivers, the vehicle's heading can then be inferred.

This transponder-based positioning approach requires:
Additional hardware in the form of the external transponders solely for the purpose of positioning the vehicle in the tank,
Transportation of the transponders, cables, power source(s), control electronics to and from the tank;
Installation of the transponders around the tank, including ensuring good acoustic coupling between the transponders and the tank's shell, (see FIG. 3A and 3B in U.S. Pat. No. 5,627,800 or FIG. 30A in U.S. Pat. No. 5,435,405 as examples of such installation configurations);
Determination of the position of the transponders around the tank (array calibration); and
Recovery of the transponders at the end of the mission
Transponder-based positioning is negatively impacted by.
Acoustic multipath near the floor
Noisy acoustic heading
Potential obstruction of the direct acoustic path between the vehicle and the transponders by obstacles in the tank In addition to acoustic positioning, crawlers (robotic vehicles that move on the tank floor) may use a form of odometry to update their position estimate between acoustic updates. This is typically done using encoders on the wheels which are affected by slippage and inaccurate calibration of the wheel radius or trackwheel length. The position estimate propagated using the encoder data either gets reset by the next acoustic fix or some form of data blending process is used to smooth out noise in the acoustic fixes.

These prior systems are unwieldy and fail to provide the positioning accuracy needed to effectively map the tank floor for integrity determination.

SUMMARY OF THE INVENTION

The positioning method and apparatus of the present invention rely on the knowledge that a horizontal cross section of an AST shell is a circle of known diameter. It includes matching acoustic travel time data measured between the vehicle and the shell to this known geometry in order to determine the vehicle's position in the tank. The functionality of the present invention enables in-tank vehicle position determination without the need for hardware external to the tank. That is, the vehicle can be "standalone" within the tank while positioning itself. This allows for simplified operations.

By keeping an estimate of its heading and acoustically ranging to the surrounding tank shell, the vehicle has enough information to determine its position within the tank, without recourse to transponders placed around the tank. The self-contained aspect of the method reduces complexity and operational constraints.

Acoustic travel times are used in two different ways:
They can be collected over a 360 deg horizontal scan in order to compute an acoustic fix that can be used to initialize position in the tank's reference frame or update the current position estimate
They can be used one by one as they come in to provide a partial correction of the current position estimate. In that case, the vehicle's motion during surveys (linear motion and turns) creates changes in the directions at which the travel times are measured which over time fully constrain the vehicle's position estimate.

The fix computation method consists of fitting a circle of known diameter to the acoustic travel times measured at different headings by optimizing the vehicle's position at the end of the 360 deg rotation and the average speed of sound in the tank so as to reduce the difference between the data and the known diameter in some sense (e.g. in a least squares sense). The result is an estimate of the vehicle's position in the tank's frame which has its origin at the center of the tank and its x-axis along the 0 deg Universal Transverse Mercator (UTM) grid heading. Such a fix is used to initialize the navigation filter.

After initialization, the vehicle uses a Doppler Velocity Log (DVL) to update its position estimate (dead reckoning). The DVL, pointed at the tank's floor, measures the three components of the vehicle's speed relative to the floor. By integration of speed over course (heading), the vehicle's position estimate can be maintained with much higher accuracy than wheel encoders which are subject to slipping and errors in the calibration of distance per turn. In an embodiment of the positioning algorithm of the present invention, the vehicle uses a combination of DVL and inertial data to update its position estimate between acoustic updates.

As the vehicles moves in the tank, it keeps pinging the horizontal echo-sounder, thereby measuring the acoustic travel time between itself and the tank's shell. These acoustic travel times can be processed one by one as observations that allow partial correction of the vehicle's position estimate. Since the vehicle position and heading change over time as the vehicle follows its planned path, the variation in directions at which the acoustic travel times are measured varies sufficiently to fully constrain the position estimate and control the positional drift that would occur without such corrections.

The fusion of dead reckoning and acoustic travel time data in order to control the dead reckoning drift can take different forms depending on the sensors selected to implement the positioning algorithm. This is further discussed below in the detailed description of the invention.

The method and apparatus of the present invention applies to low-to-the-ground crawlers such as the vehicle described in U.S. Pat. No. 5,205,174, to vehicles able to roll on the floor or swim such as the hybrid ROV described in US patent application 20160299031.

DETAILED DESCRIPTION OF THE INVENTION

Attitude and Heading Sensors

The invention requires the vehicle to maintain an estimate of its attitude (pitch and roll) and heading. This can be accomplished using one or more of the sensors described below.

Electronic Magnetic Compass

Although electronic magnetic compasses are small, cheap, and low-cost, they are not well-suited to measuring the vehicle's heading due to the magnetic disturbance introduced by the steel tank floor, steel obstacles on the floor, and the steel tank shell. This disturbance varies with the vehicle's position in the tank which makes it difficult to compensate for it. Nevertheless, it is an option as part of the present invention. This type of compass typically includes pitch and roll sensors as well.

Gyrocompass

A gyrocompass contains an Inertial Measurement Unit (IMU) with angular rate sensors of quality sufficient to measure the earth's rotation. It also includes software used to align (find level and geographic north). After alignment, the gyrocompass maintains an accurate estimate of the vehicle's geographic heading, pitch, and roll that is not affected by the surrounding steel. Suitable gyrocompass examples include but are not limited to iXBlue OCTANS and OCTANS Nano, OceanTools OceanFOG, and CDL TOGS.

Inertial Navigation System

Like a gyrocompass, an Inertial Navigation System (INS) includes higher grade angular rate sensors that support initial alignment to find level and north. In addition to attitude, an INS is also able to compute speed and position. These parameters are derived by integration of the data provided by the inertial sensors. The drift in velocity and position is controlled using input from external aiding sensors, such as a DVL, or an acoustic positioning system. Suitable INS examples include but are not limited to iXBlue PHINS Compact Series, Advanced Navigation Spatial FOG, Kearfott Sea-Kit-16 and Sea-Kit-24.

Speed Sensors

The invention requires the vehicle to measure its speed relative to the tank's floor. This can be accomplished using one or more of the sensors described below.

Wheel Encoders

Encoders are often used in vehicles that roll in contact with a floor because they are small and cheap. They are, however, subject to slippage and calibration errors which limit their short term accuracy. Nevertheless, it is an option as part of the present invention.

Acoustic Velocity Log

A Doppler Velocity Log (DVL) typically measures the Doppler shift on four acoustic beams to determine the vehicle's velocity relative to the floor DVL data accuracy depends on the knowledge of the speed of sound in the medium near the DVL, which can be measured using a sound velocity sensor placed near the DVL A DVL can be used in a swimming vehicle or even a crawler as long as the face of the DVL is mounted in the vehicle so that its transducers are further from the floor than a minimum distance below which speed can no longer be measured. This distance is about 6 to 7" in commercially-available DVLs but can be reduced by customization. Using a DVL rather than wheel encoders allows for vehicle that can swim to navigate exactly the same way when they swim and when they are in contact with the floor. Encoders only work in contact and are therefore only applicable to crawlers. Suitable DVL examples include but are not limited to Teledyne RDI 1200 kHz Workhorse DVL, Nortek 1 MHz DVL, Sonardyne 600 kHz Syrinx DVL, and Rowe Technologies SeaPilot 1200 kHz DVL. Phased-array and correlation velocity logs fall under the acoustic velocity log category and can also be used to measure the vehicle's velocity. Suitable sensors include but are not limited to Teledyne RDI's Explorer phased array DVL, and Kraken Aquatrak correlation log.

Inertial Navigation System

An INS can theoretically provide a speed estimate from the integration of acceleration data. In practice, this estimate drifts so fast that it is not usable. The INS must be aided by a DVL to control the inertial drift. An INS aided by a DVL can provide very accurate speed by taking advantage of the complementarity of the DVL and INS data. Virtually all subsea robotics applications that involve an INS use a DVL as aiding device.

Dead Reckoning with Attitude, Heading, and Speed

To dead reckon between position updates, the vehicle integrates its horizontal speed relative to the floor over its course measured using one of the heading sensors described above Speed can be provided by wheel encoders, a DVL, or a combination of DVL and inertial data.

Another way to dead reckon between acoustic updates is to feed DVL data into an INS in addition to depth data needed to stabilize the INS' vertical channel. The INS uses the long term stability of the DVL data and the short term accuracy of speed derived from inertial data to obtain an accurate and less noisy speed estimate than the raw DVL data. The INS then uses its internal estimate of heading, pitch, and roll to propagate the vehicle's position. With DVL aiding, the INS's position estimate still drifts at a typical rate of 0.1% to 0.3% of the distance traveled for the kind of INS that can be integrated in a tank robot.

Whatever dead reckoning solution is implemented, the position estimate will drift over time and will need to be updated using an absolute estimate of the vehicle's position. This absolute position estimate is provided by acoustic positioning.

Acoustic Ranging to the Tank's Shell

In this invention, the vehicle acoustically ranges to the tank's shell instead of ranging to transponders deployed around the shell at known locations (as is used in the prior art). In this invention, the vehicle basically uses the existing environment without any modification.

Ranging to the tank's shell can be used in two different ways:

Acoustic fix computation. Several acoustic travel time measurements at different heading angles can be combined to compute an acoustic position fix that can be used to initialize and update the dead reckoned position.

Single acoustic travel time aiding can also be used to partially constrain the vehicle's position estimate. The accumulation of such travel times at different heading angles or positions within the tank ultimately provides sufficient information to prevent positional drift.

The different embodiments associated with acoustic fix computation and single acoustic travel time aiding are discussed below.

Acoustic Fix Computation

An acoustic range measurement can be obtained using a single narrow conical beam echo-sounder mounted horizontally in the vehicle. A single measurement does not provide sufficient information to compute a fix Several such measurements at different angles are needed and can be obtained using several echo-sounders, a 360 deg acoustic profiler, or single/several single beam echo-sounder(s) mounted on a vehicle able to rotate (yaw) 360 deg.

Three Single Beam Echo-Sounders Mounted in the vehicle at 120 deg Offset

In theory, three range measurements 120 deg apart provide sufficient information to determine the vehicle's position without ambiguity because the circular cross section of the tank can be uniquely matched to three data points. The ranging system can, therefore, be as simple as three echo-sounders mounted horizontally in the vehicle at 120 deg yaw spacing (for instance 0, 120, and 240 deg). Suitable examples of single beam echo-sounders include but are not limited to Echologger ECT400, Imagenex 852, Impact Subsea ISA500, and Tritech Micron.

In practice, an acoustic pencil beam hitting the tank's shell at normal incidence will provide the best results. This would be the case for all three beams if the vehicle were located at the center of the tank. As the vehicle moves around in the tank, however, some beams will hit the tank's shell at much shallower grazing angles than normal incidence, which could result in specular reflection and lack of a sufficiently strong return signal to be detected by the vehicle. With less than three returns, the vehicle is not able to compute its position. Therefore, additional range measurements are preferred around the vehicle.

360-deg Pencil Beam Acoustic Profiler

Additional range measurements can be obtained using a 360-deg pencil beam acoustic profiler. This system measures the acoustic range between the vehicle and the tank's shell over 360 deg, at a predefined angular spacing. For instance, a profiler can be configured to ping over 360 deg at 0.9 deg spacing (400 range measurements around the vehicle). With 400 hits on the tank's shell, the data can be processed with outlier rejection algorithms and the remaining data fitted with a circle using a least squares fitting algorithm. The large number of measurements ensures that many data points will be obtained at good incidence over 360 deg. It is also possible to select the range data that have an incidence angle between +/−N degrees from normal incidence. Such data subset is well-conditioned to support the optimization because some of the selected data points will be on one side of the circle and the rest on the opposite side. Suitable examples of acoustic profilers include but are not limited to Tritech Super SeaKing Dual Frequency Profiler, Imagenex 881L Profiling sonar, and Marine Electronics 1512E profiler.

Single Beam Echo-Sounder on a Spinning Vehicle

If the carrier vehicle has the ability to spin in place, a 360 deg scan can be obtained from a single beam echo-sounder by spinning the vehicle in place while continuously pinging the echo-sounder. The data can then be filtered and fitted with a circle by least squares fitting.

Single Beam Echo-Sounders Mounted at 360/N deg on a Spinning Vehicle

If N echo-sounders are mounted 360/N deg apart and are pinged in sequence fast enough, the vehicle only needs to rotate 360/N deg in place for the echo-sounders to collect data over the entire circumference of the tank.

Single Acoustic Travel Time Aiding

In its minimal form, the robot only needs to be fitted with one horizontal echo-sounder. As the vehicle moves along its inspection path that consists of linear motion and rotations, the echo-sounder's acoustic beam hits the shell at different locations which provides sufficient information to correct the dead reckoned position and prevent its drift over time.

Additional echo-sounders (one echo-sounder 90 deg off of the first one, two additional echo-sounders 120 deg off, or even a 360 deg profiler) only provide further information that benefits the position estimation process at the expense of hardware cost, volume and mass in the robot.

INS Alignment

When using an INS, the INS must first be aligned before it can be used for navigation (find local level as well as geographic north, and initialize velocity and position). Traditionally, in subsea survey application, the INS is aligned with the vehicle on the deck of a ship by GPS using a "moving base alignment" procedure. At completion of the alignment, the vehicle is launched into the ocean.

For inspection of a tank filled with water, the INS can be aligned on the tank's roof using a "stationary alignment" procedure that may involve 90-deg rotations between stationary phases. After the alignment completes, the vehicle can be launched into the tank.

When operating in tanks filled with petroleum products that create flammable vapors, the vehicle can be aligned on the roof as long as the vehicle design is compatible with the hazardous locations requirements associated with the specific tank design and product content.

For battery-powered mobile robots that do not carry power over a tether crossing the liquid-gas interface in the manhole, it is preferable to keep the vehicle powered off until it is fully submerged in the liquid, at which point it is safe to power up. Once fully submerged, however, GPS is no longer accessible. The vehicle can be designed to be negatively buoyant and land on the tank's floor right under the manhole. The manhole's position can be measured by a handheld GPS receiver ahead of the vehicle's deployment and entered into the vehicle as a software configuration parameter before the vehicle is launched (untethered vehicle) or passed over a fiber optic data tether after the software boots (tethered vehicle). The INS can then align on the tank's floor using a fixed "GPS" position and "stationary alignment" procedure.

Position Initialization or Correction Using an Acoustic Fix

Acoustic Fix Computation Algorithm

The objective of the acoustic position estimator is to compute a position estimate of the vehicle that is primarily based on acoustic ranging from the vehicle to the tank's shell. This acoustic fix is obtained at a much lower rate than the dead-reckoned position and can be used to control the drift in the dead-reckoned position by proper filtering.

The algorithm contains two phases:
Data collection (FIG. 3)
Data processing (FIG. 4)

Figure 3:
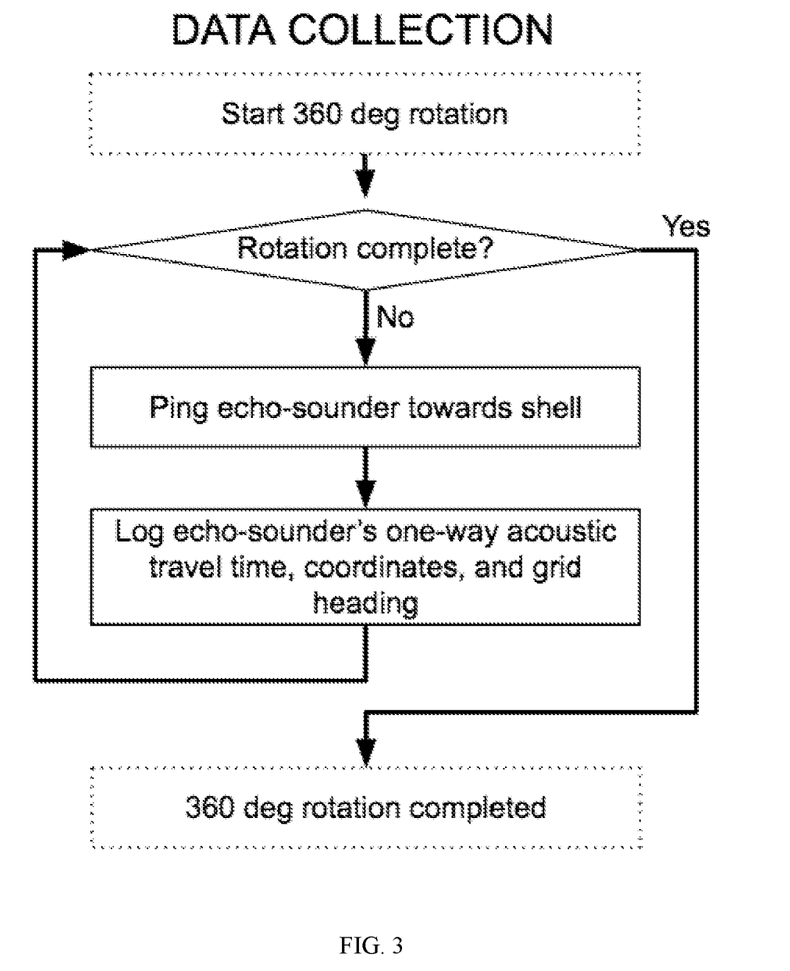
FIG. 3 is a flow diagram showing steps involved in the data collection phase of the acoustic fix computation algorithm. This phase is complete when the 360 deg rotation of the vehicle or the acoustic profiler terminates.

The data collection phase involves either a vehicle rotating 360 deg in place while pinging a horizontal single beam echo-sounder towards the tank shell or a vehicle remaining static while a motorized horizontal 360 deg acoustic profiler scans the tank shell 360 deg around the fixed vehicle.

The data processing phase rejects outliers in the measured acoustic travel times, applies lever arm/misalignment corrections as well as motion compensation and processes all the data collected during the acquisition phase into an optimization algorithm.

Figure 4:
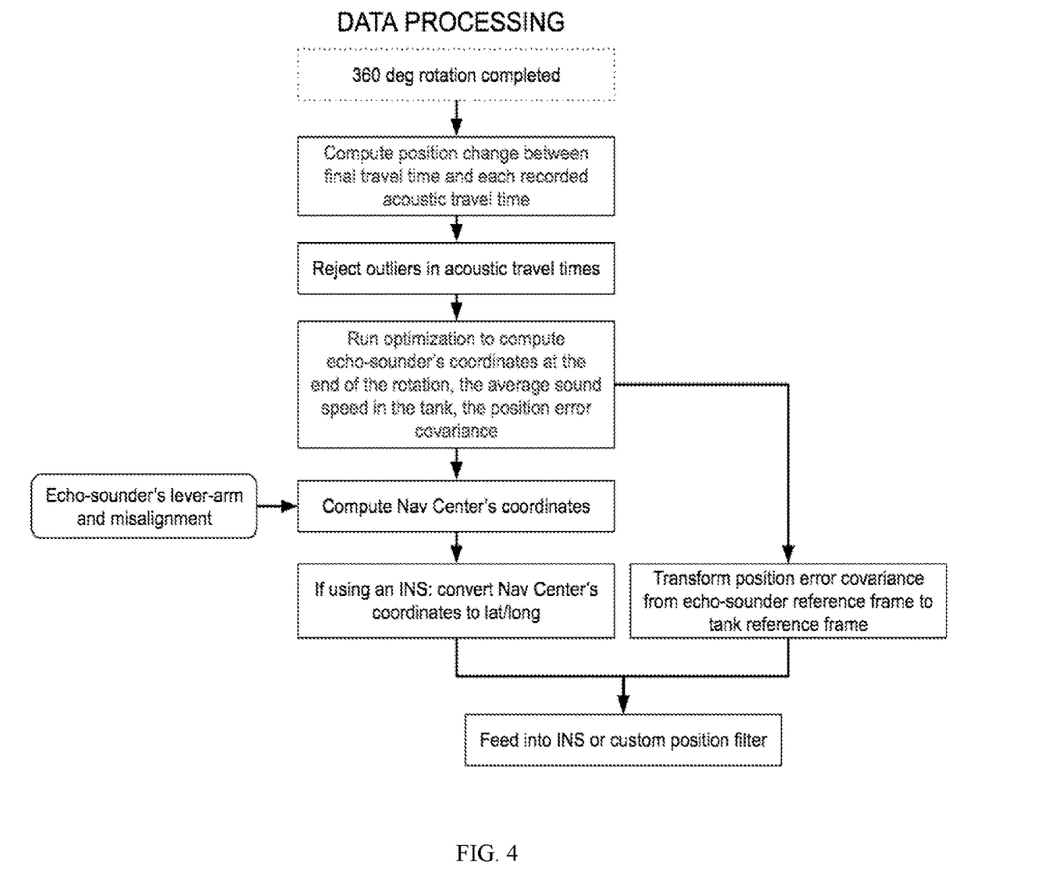
FIG. 4 is a flow diagram showing steps involved in the data processing phase of the acoustic fix computation, which takes place right after the data collection phase is completed.

The two phases of the algorithm are shown in FIGS. 3 and 4.

Optimization Algorithm

Given the known tank radius $R_T$, the equation that defines the tank's shell in the local UTM right-handed reference frame attached to the tank (origin at the center of the tank, x axis at 0 deg grid heading, and z down) is.

$$x^2 + y^2 = R_T^2$$

The point of impact of the echo-sounder's $i^{th}$ acoustic ping on the tank's shell has local UTM coordinates $(x_i, y_i)$. There are a total of N such points over the 360 deg rotation (i=1 to N). These points being on the tank's shell verify the equation that defines the tank's shell. Therefore:

$$x_i^2 y_i^2 = R_T^2$$

Each acoustic point of impact with the tank's shell $(x_i, y_i)$ can be expressed as a function of the echo-sounder's local UTM position at the time of the ping $(x_{Ei}, y_{Ei})$, the echo-sounder's grid heading $\psi_{Ei} = \psi_{INSi} + \Delta\psi_{INS/E}$, and the oneway travel time $T_i$ by:

$$x_i = x_{Ei} + cT_i \cos(\psi_{Ei})$$

$$y_i = y_{Ei} + cT_i \sin(\psi_{Ei})$$

Where:
$\psi_{INSi}$ is the INS's grid heading at the time the ith travel time is measured and $\psi_{Ei}$ is the echo-sounder's grid heading at that same time,
$\Delta\psi_{INS/E}$ is the heading misalignment of the echo-sounder with respect to the INS reference frame (see FIG. 5)
c is the average speed of sound around the vehicle that will be estimated together with the echo-sounder's local UTM coordinates. (The 3 parameters to be estimated are $x_{EN}$, $y_{EN}$, and c)

Approximation: The echo-sounder's position change between the time of the ping and the time of the echo detection by the echo-sounder is negligible because the vehicle speed is very slow compared to the speed of sound. Since $[x_{Ei} \ y_{Ei}]^T = [x_{EN} \ y_{EN}]^T - [\Delta x_{EiN} \ \Delta y_{EiN}]^T$, the equation above can be rewritten as follows.

$$x_i x_{EN} - \Delta x_{EiN} + c \ T_i \cos(\psi_{Ei})$$

$$y_i = y_{EN} - \Delta y_{EiN} + c \ T_i \sin(\psi_{Ei})$$

Where $(\Delta x_{EiN}, \Delta y_{EiN})$ is the echo-sounder's position change between the time the $i^{th}$ travel time measurement is made and the time of the $N^{th}$ (final) travel time measurement. This relative position change is accurately measured by the INS % DVL.

Reporting the equation above in the circle's equation, we get:

$$[x_{EN}-\Delta x_{EiN}+c\,T_i\cos(\psi_{Ei})]^2+[y_{EN}-\Delta y_{EiN}+c\,T_i\sin(\psi_{Ei})]^2-R_T^2=0 \text{ for } i=:1 \text{ to } N$$

We have a system of N equations with 3 unknowns ($x_{EN}$, $y_{EN}$, c) that can be solved by a nonlinear least squares optimization technique such as Levenberg-Marquardt Once ($x_{EN}$, $y_{EN}$, c) are estimated, using the known translation and rotation between the INS and the echo-sounder, we can compute the INS' local UTM coordinates by:

$$x_{INSN}=x_{EN}-\cos(\psi_{INSN})\Delta x_{INS/E}+\sin(\psi_{INSN})\Delta y_{INS/E}$$

$$y_{INSN}=y_{EN}-\sin(\psi_{INSN})\Delta x_{INS/E}-\cos(\psi_{INSN})\Delta y_{INS/E}$$

Figure 5:
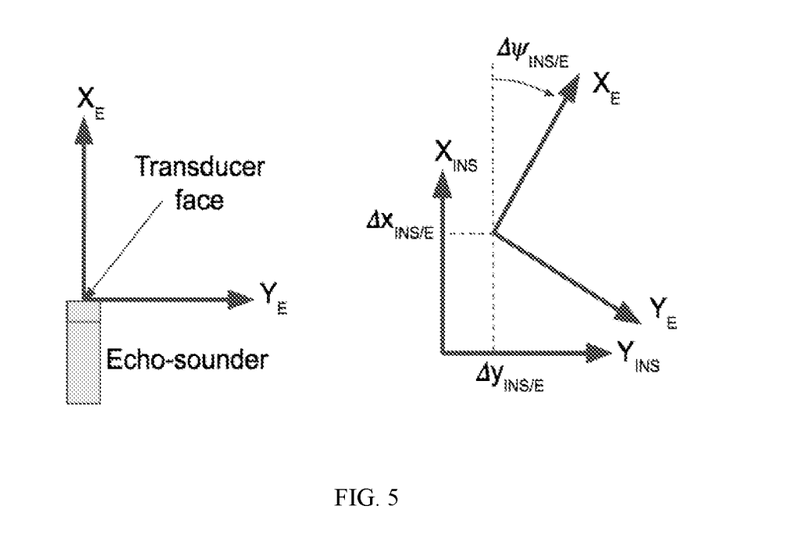
FIG. 5 shows the definition of the lever arm and heading misalignment of the echo-sounder relative to an INS.

See FIG. 5 for the definition of the lever arms $\Delta x_{INS/E}$ and $\Delta y_{INS/E}$.

Figure 1:
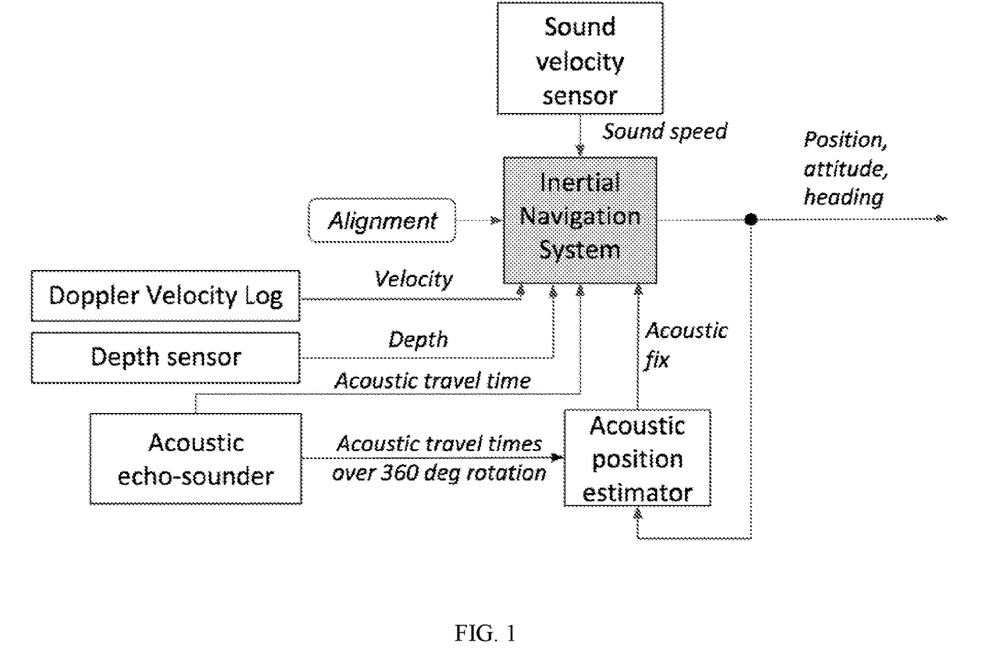
FIG. 1 is a simplified block diagram showing how hardware components that can be used to carry out the method are interconnected to compute the vehicle's position, attitude and heading in an embodiment that makes use of an Inertial Navigation System (INS).

We can then add the UTM coordinates of the tank's center and convert the result to a latitude and longitude fix, if the fix is to be fed as position aid into an INS, Control of the Dead Reckoned Position Drift In an embodiment, the acoustic fix is provided as a position aid to the INS and integrated into the navigation solution by the INS's internal filter (FIG. 1).

A variety of other approaches can be employed to correct the positional drift associated with dead reckoning The vehicle can dead reckon until the next acoustic fix and reset its position estimate to the acoustic fix. This will produce jitter in the vehicle's position estimate due to the noise affecting the acoustic fixes;

The vehicle can blend the dead reckoned position estimate and the acoustic fix using a weighted average based on the uncertainty associated with the two position estimates;

The dead reckoned position estimate and acoustic fix can be filtered using a custom navigation Kalman filter (FIG. 2); and The dead reckoning and acoustic data can be blended using any other approach that efficiently combines high frequency data accurate over a short period of time with low frequency data that is noisy but not subject to drift with time.

Figure 6:
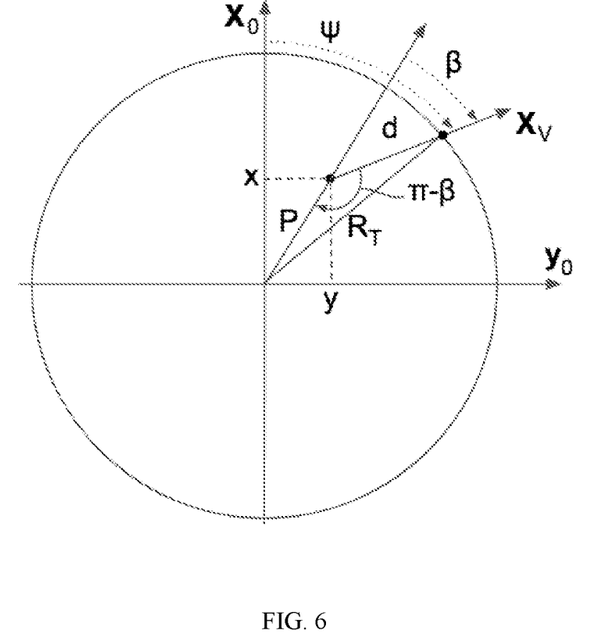
FIG. 6 shows the relationship between an acoustic travel time between the vehicle and the shell and the vehicle's current position and heading.

Correction of the Vehicle's Position Estimate using Acoustic Travel Times to the Tank's Shell Assuming that the echo-sounder points along the vehicle's forward axis $x_v$, the following relationship between acoustic travel time T to the shell and the vehicle's position and heading (x, y, ψ) can be derived from FIG. 6:

$$d=-P\cos\beta+[R_T^2-P^2\sin^2\beta]^{1/2}-x_{Lever}=c\,T$$

where:

$R_T$ is the known tank radius

T is the one way acoustic travel time between the echo-sounder and the tank's shell $P=[x^2+y^2]^{1/2}$ where (x,y) is the vehicle's position at the time travel time T was measured $\beta$ψ–a tan 2(y,x), where ψ is the vehicle's heading c is the measured sound speed in the liquid d is the range from the echo-sounder to the shell which is equal to cT $x_{Lever}$ is the distance from the navigation center to the echo-sounder's transducer face along $x_v$ If the vehicle's estimated position and heading is (x, y, ψ), the acoustic travel time to the shell can be predicted as.

$$T_{pred}=1/c(-[x^2+y^2]^{1/2}\cos(\psi-a\tan 2(y,x))+[R_T^2-[x^2+y^2]\sin^2(\psi-a\tan 2(y,x))]^{1/2}-x_{Lever}\}$$

A measured acoustic travel time T can then be compared to the predicted acoustic travel time $T_{pred}$ and the difference (innovation) used to correct the predicted position by weighing the level of correction with the confidences in T and $T_{pred}$. This can be implemented within a Kalman filter framework where the vehicle's position is predicted and the acoustic travel time is used as an observation to correct the prediction. Additional state variables such as the DVL's misalignment with respect to the heading reference and a residual DVL scale factor after sound speed scaling can be included in the state vector and estimated by the filter.

Figure 2:
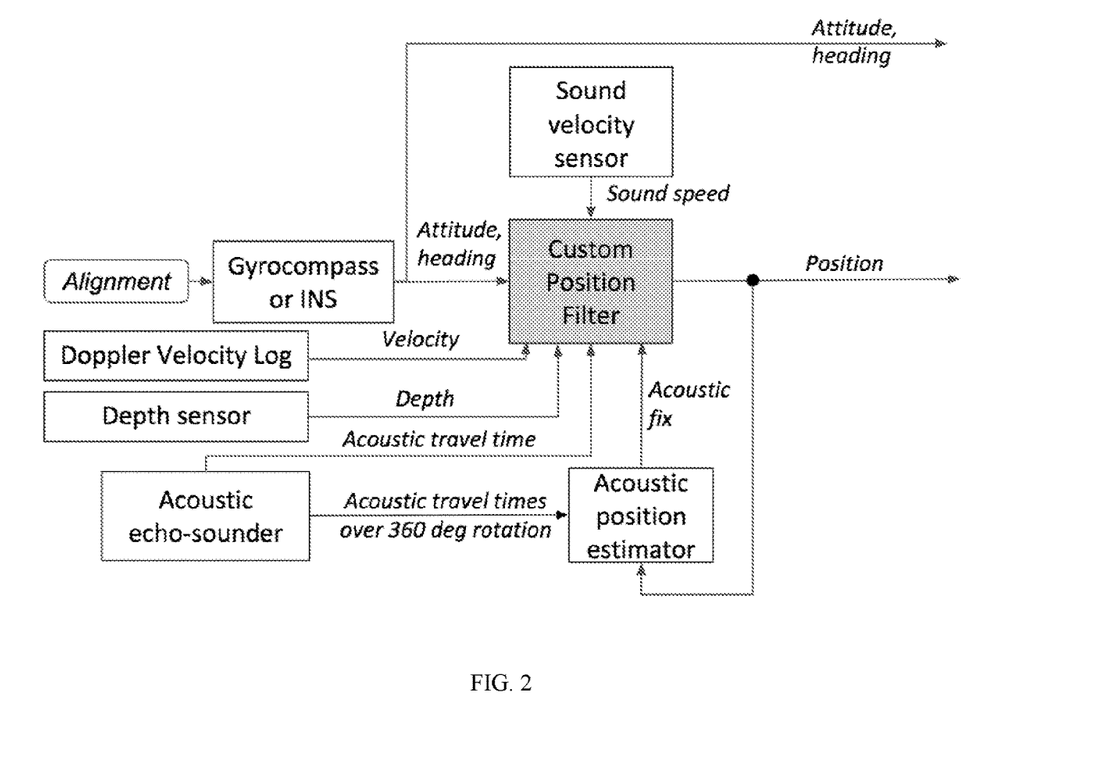
FIG. 2 shows an embodiment in which a gyrocompass (or an INS used as a gyrocompass) and a custom position filter are used.

In order to feed acoustic travel times into an INS as position aids, the INS vendor first needs to modify its INS navigation software to accept and process such travel times (FIG. 1). If this is not possible, a custom filter must be written and run as part of the vehicle's onboard software (FIG. 2).

The invention has been described herein as a method for positioning an autonomous or remotely-operated vehicle in a tank containing a liquid. This method is carried out using a vehicle/controller of one or more configuration options depending on whether the vehicle is tethered or not and whether an INS is used or not. The vehicle may be tethered, untethered, battery-powered or powered over the tether, a crawler, a swimming vehicle or a hybrid crawler/swimming vehicle fitted with a navigation sensor suite suitable for both forms of movement. The controller may be any kind of external or embedded computing device such as a laptop/desktop computer, tablet, smartphone, embedded computer stack, microcontroller, or other form of computing device programmed to carry out instructions established in computer programming using any of a variety of computing languages known to those skilled in the art of this invention. The programming carries out instructions represented in the flowcharts of FIGS. 3 and 4 as well as the software implementation of the navigation filter when using such a filter. Information may be exchanged between the vehicle and the controller through one or more wired or wireless interfaces.

Figure 7:
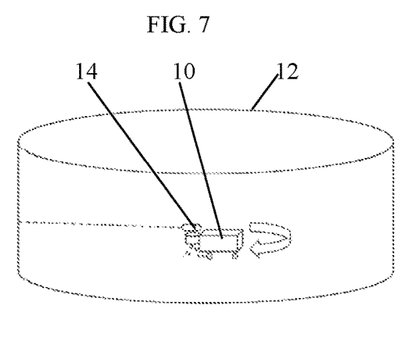
FIG. 7 is a simplified representation of a first in-tank vehicle configuration for use in the method of the present invention, wherein vehicle navigation includes the use of a single-beam echo sounder.
Figure 8:
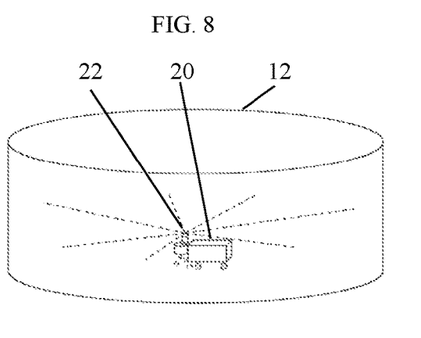
FIG. 8 is a simplified representation of a second in-tank vehicle configuration for use in the method of the present invention, wherein vehicle navigation includes the use of a 360-deg acoustic profiler.

In any of the optional vehicle/controller configurations, the vehicle can either be fitted with a single beam acoustic sounder (FIG. 7) or a 360 deg acoustic profiler (FIG. 8). FIG. 7 illustrates a first vehicle 10 in a tank 12 wherein the vehicle 10 is configured with a single-beam acoustic sounder 14. FIG. 8 illustrates a second vehicle 20 in the tank 12 wherein the vehicle 20 is configured with a 360-deg acoustic profiler 22. In both cases, the vehicle (10 or 20) includes one or more speed sensors, one or more attitude and heading sensors, one or more sound sensors, one or more depth sensors and a communications interface.

Figure 9:
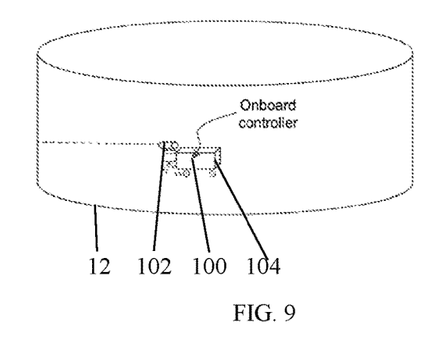
FIG. 9 is a simplified representation of a vehicle configuration for use in the method of the present invention, wherein the vehicle controller is onboard the untethered vehicle.
Figure 11:
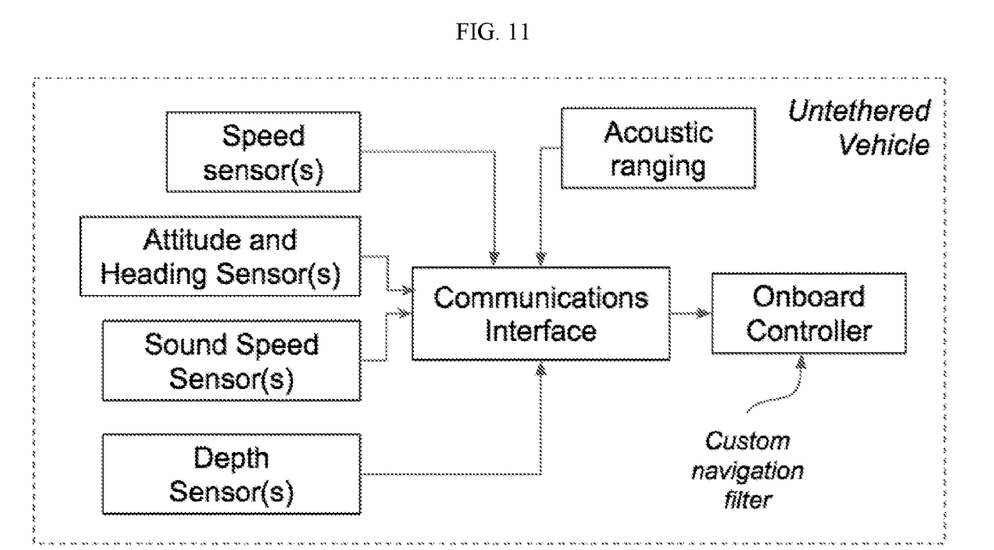
FIG. 11 is a block diagram showing primary components of an apparatus of the present invention using an onboard controller running a custom position filter for positioning an untethered vehicle.
Figure 12:
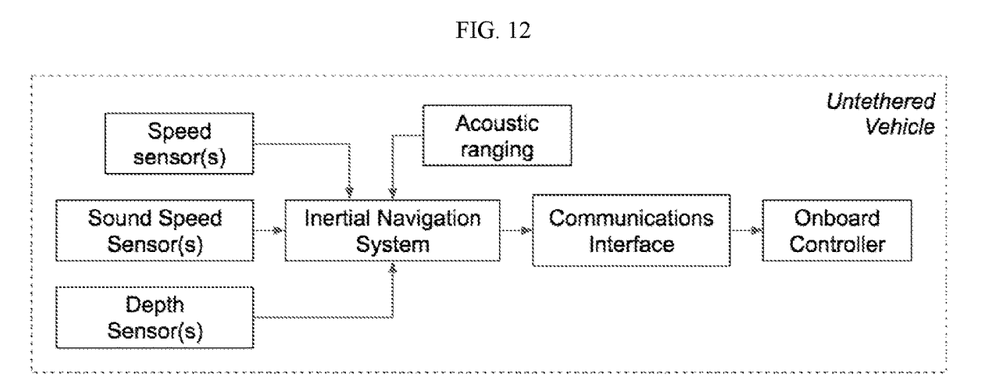
FIG. 12 is a block diagram showing primary components of an apparatus of the present invention using an onboard controller that receives an integrated navigation solution from an INS for positioning an untethered vehicle.

FIG. 9 illustrates an untethered vehicle 100 in the tank 12 wherein the vehicle 100 is shown as including a single-beam acoustic sounder 102 but that could alternatively use a 360-deg acoustic profiler. The vehicle 100 includes a controller 104 that is onboard the vehicle 100 rather than external to it. In one untethered vehicle configuration, a communications interface is used to transmit data gathered by the navigation sensors to an onboard controller used to compute the vehicle's position and control the vehicle as represented in FIG. 11. In another untethered vehicle configuration, the communications interface is used to transmit the integrated navigation solution calculated by the INS to an onboard controller used to control the vehicle as represented in FIG. 12.

Figure 10:
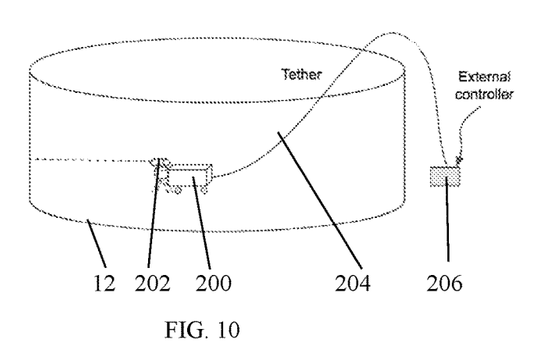
FIG. 10 is a simplified representation of a vehicle configuration for use in the method of the present invention, wherein the vehicle controller is external to the tank.
Figure 13:
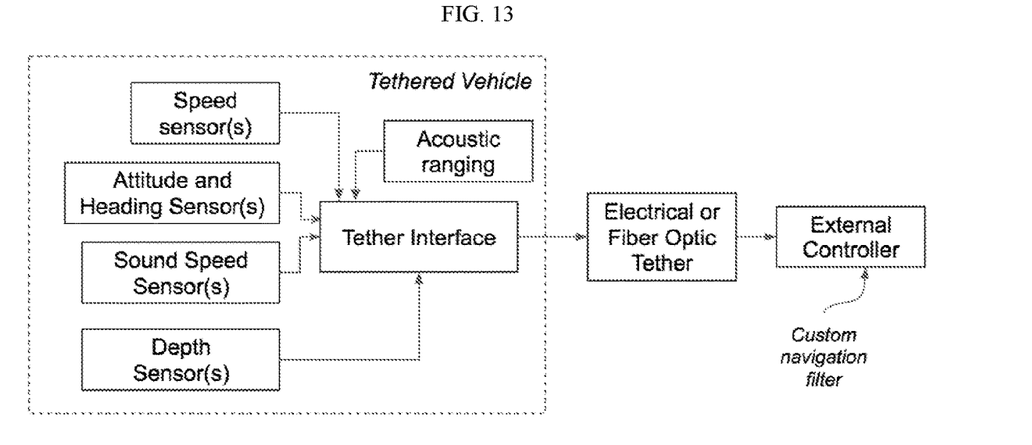
FIG. 13 is a block diagram showing primary components of an apparatus of the present invention using an external controller running a custom position filter for positioning of a tethered vehicle.
Figure 14:
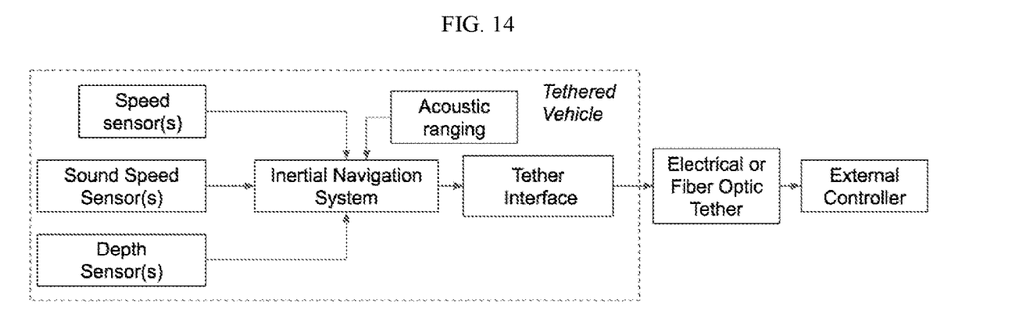
FIG. 14 is a block diagram showing primary components of an apparatus of the present invention using an external controller that receives an integrated navigation solution from an INS for positioning a tethered vehicle.
Figure 15:
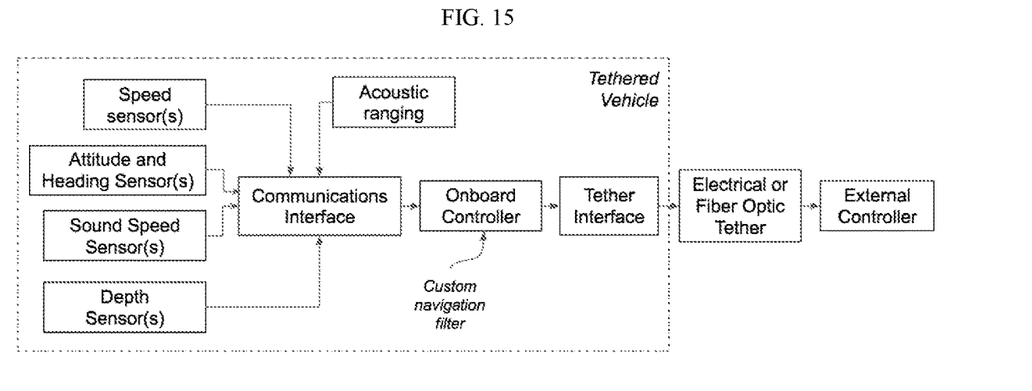
FIG. 15 is a block diagram showing primary components of an apparatus of the present invention using an external controller that receives an integrated navigation solution computed by a custom position filter running on an onboard controller for positioning a tethered vehicle.

FIG. 10 illustrates a tethered vehicle 200 in the tank 12 wherein the vehicle 200 is shown as including a single-beam acoustic sounder 202 but that could alternatively use a 360-deg acoustic profiler. The vehicle 200 is coupled to a tether 204 that includes wiring to connect to navigation functions of the vehicle 200 to a controller 206 that is external to the tank 12. In one tethered vehicle configuration, the tether is used to transmit raw navigation sensor data to an external controller that computes the vehicle's position and controls the vehicle as shown in FIG. 13. In another tethered vehicle configuration, the tether is used to transmit the integrated navigation solution calculated by the INS to an external controller used to control the vehicle as shown in FIG. 14. In yet another tethered vehicle configuration, the tether is used to transmit the integrated navigation solution computer by an onboard controller to an external controller used to control the vehicle as shown in FIG. 15.

While the invention has been described with respect to specific examples, it is to be understood that it is not limited thereto Instead, the scope of the invention is defined by the following claims and equivalents thereof.

What is claimed is:

1. A method for positioning of an autonomous or remotely operated vehicle in a vertical cylindrical storage tank filled with a liquid, wherein the tank has a known diameter and includes a shell and a floor containing an interior of the tank, the method comprising the steps of:
    directing movement of a vehicle within the tank either in contact with or above the floor of the tank, wherein the vehicle includes one or more sensors for measuring roundtrip travel time of an acoustic wave between the vehicle and the tank shell, one or more sensors for measuring a speed of sound in the liquid, one or more sensors for measuring heading, pitch and roll of the vehicle, and one or more sensors for measuring speed of the vehicle relative to the floor of the tank independent of vehicle movement slippage;
    calculating a current vehicle position estimate based on an acoustic fix of a location of the vehicle in the tank by processing acoustic travel times between the vehicle and the shell obtained by gathering acoustic information through at least a portion of a circumference of the tank, wherein the processing includes use of the known diameter of the tank; and
    correcting the current vehicle position estimate with a single acoustic travel time using a navigation filter.

2. The method of claim 1 wherein the one or more sensors for measuring heading, pitch and roll of the vehicle include a magnetic compass.

3. The method of claim 1 wherein the one or more sensors for measuring heading, pitch and roll of the vehicle include a gyro compass.

4. The method of claim 1 wherein the one or more sensors for measuring heading, pitch and roll of the vehicle form part of an inertial navigation system.

5. The method of claim 1 wherein the one or more sensors for measuring speed of the vehicle include one or more wheel encoders.

6. The method of claim 1 wherein the one or more sensors for measuring speed of the vehicle include the use of an acoustic velocity log.

7. The method of claim 1 wherein the one or more sensors for measuring speed of the vehicle form part of an inertial navigation system.

8. The method of claim 1 wherein the one or more sensors for measuring speed, heading, pitch and roll of the vehicle are configured for dead reckoning position determination.

9. The method of claim 1 wherein position is determined using an acoustic fix computation.

10. The method of claim 1 including the use of one or more single-beam echo sounders for ranging when the vehicle is capable of spinning in place.

11. The method of claim 1 including the use of a pencil beam acoustic profiler when the vehicle is unable to spin in place or for supplemental ranging without vehicle rotation.

12. The method of claim 1 wherein the step of gathering acoustic information through at least a portion of the circumference of the tank includes rotating the vehicle in the tank.

13. The method of claim 1 wherein the step of gathering acoustic information through at least a portion of the circumference of the tank includes scanning around the vehicle with a 360 deg acoustic profiler.

14. An apparatus for positioning of an autonomous or remotely operated vehicle in a vertical cylindrical storage tank filled with a liquid, wherein the tank has a known diameter and includes a shell and a floor containing an interior of the tank, the apparatus comprising:
    a vehicle capable of functioning within the liquid in the tank and that may be in contact with the floor of the tank or that may hover above the floor of the tank or both, wherein the vehicle includes one or more sensors for measuring roundtrip travel time of an acoustic wave between the vehicle and the tank shell, one or more sensors for measuring a speed of sound in the liquid, one or more sensors for measuring heading, pitch and roll of the vehicle, and one or more sensors for measuring speed of the vehicle relative to the floor of the tank independent of vehicle movement slippage; and
    a controller configured to calculate a current vehicle position estimate based on an acoustic fix of a location of the vehicle in the tank by processing acoustic travel times between the vehicle and the shell obtained by gathering acoustic information through at least a portion of a circumference of the tank, wherein the processing includes use of the known diameter of the tank, and to correct the current vehicle position estimate with a single acoustic travel time using a navigation filter.

15. The apparatus of claim 14 wherein the one or more sensors for measuring heading, pitch and roll of the vehicle include a magnetic compass.

16. The apparatus of claim 14 wherein the one or more sensors for measuring heading, pitch and roll of the vehicle include a gyro compass.

17. The apparatus of claim 14 wherein the one or more sensors for measuring heading, pitch and roll of the vehicle form part of an inertial navigation system.

18. The apparatus of claim 14 wherein the one or more sensors for measuring speed of the vehicle include one or more wheel encoders.

19. The apparatus of claim 14 wherein the one or more sensors for measuring speed of the vehicle include the use of an acoustic velocity log.

20. The apparatus of claim 14 wherein the one or more sensors for measuring speed of the vehicle form part of an inertial navigation system.

21. The apparatus of claim 14 wherein the one or more sensors for measuring speed, heading, pitch, and roll of the vehicle are configured for dead reckoning position determination.

22. The apparatus of claim 14 wherein position is determined using an acoustic fix computation.

23. The apparatus of claim 14 including the use of one or more single-beam echo sounders for ranging when the vehicle is capable of spinning in place.

24. The apparatus of claim 14 including the use of a pencil beam acoustic profiler when the vehicle is unable to spin in place or for supplemental ranging without vehicle rotation.

25. The apparatus of claim 14 wherein the step of gathering acoustic information through at least a portion of the circumference of the tank includes rotating the vehicle in the tank.

26. The apparatus of claim 14 wherein the step of gathering acoustic information through at least a portion of the circumference of the tank includes scanning around the vehicle with a 360 deg acoustic profiler.

* * * * *

UNITED STATES PATENT AND TRADEMARK OFFICE
CERTIFICATE OF CORRECTION

| | | |
|---|---|---|
| PATENT NO. | : 11,525,681 B2 | |
| APPLICATION NO. | : 17/575392 | |
| DATED | : December 13, 2022 | |
| INVENTOR(S) | : Jerome Vaganay | |

It is certified that error appears in the above-identified patent and that said Letters Patent is hereby corrected as shown below:

In the Specification

1) Equation in Column 8, Line 31:
$x_i^2 y_i^2 = R_T^2$ should become $x_i^2 + y_i^2 = R_T^2$ 2) Equation in Column 8, Line 38:
$x_i = X_{Ei} + cT_i$ should become $x_i = x_{Ei} + cT_i \cos(\psi_{Ei})$ 3) Equation in Column 8, Line 55:
$[x_{Ei}\ y_{Ei}]^T = [x_{EN}\ y_{EN}]^T - [\Delta X_{EiN}\ y_{EiN}]^T$ should become $[x_{Ei}\ y_{Ei}]^T = [x_{EN}\ y_{EN}]^T - [\Delta x_{EiN}\ y_{EiN}]^T$ 4) Equation in Column 8, Line 59:
$x_i\ x_{EN} - \Delta x_{EiN} + cT_i \cos(\psi_{Ei})$ should become $x_i = x_{EN} - \Delta x_{EiN} + cT_i \cos(\psi_{Ei})$ 5) Equation in Column 9, Line 57:
$B\psi\text{-a tan } 2(y,x)$ should become $B\psi = \mathrm{atan2}(y,x)$ 6) Equation in Column 9, Line 65:
$T_{pred} = 1/c(-[x^2+y^2]^{1/2} \cos(\psi\text{-}a\tan 2(y,x)) + [R_T^2-[x^2+y^2] \sin^2(\psi\text{-}a\tan 2(y,x))]^{1/2} - x_{Lever}\}$ should be
$T_{pred} = 1/c\{-[x^2+y^2]^{1/2} \cos(\psi\text{-}\mathrm{atan2}(y,x)) + [R_T^2 - [x^2+y^2] \sin^2(\psi\text{-}\mathrm{atan2}(y,x))]^{1/2} - x_{Lever}\}$ Signed and Sealed this
Twenty-eighth Day of February, 2023

Katherine Kelly Vidal
*Director of the United States Patent and Trademark Office*